United States Patent [19]

Cronin

[11] Patent Number: 4,488,053
[45] Date of Patent: Dec. 11, 1984

[54] ELECTRIC CONSTANT SPEED/VARIABLE SPEED DRIVE/GENERATOR ASSEMBLY

[75] Inventor: Michael J. Cronin, Sherman Oaks, Calif.

[73] Assignee: Lockheed Corporation, Burbank, Calif.

[21] Appl. No.: 234,761

[22] Filed: Feb. 17, 1981

[51] Int. Cl.³ .............................................. H02P 9/00
[52] U.S. Cl. ....................................... 290/4 C; 290/6; 322/40
[58] Field of Search ................. 290/6, 1 C, 4 C, 40 B; 310/99, 101, 113; 318/13, 77; 244/58; 322/40

[56] References Cited

U.S. PATENT DOCUMENTS

| | | | |
|---|---|---|---|
| 2,597,357 | 5/1952 | McCormick | 290/4 R |
| 3,056,914 | 10/1962 | Potter | 322/40 |
| 3,974,396 | 8/1976 | Schonball | 290/54 |

Primary Examiner—J. V. Truhe
Assistant Examiner—Shelley Wade
Attorney, Agent, or Firm—Louis L. Dachs

[57] ABSTRACT

The invention is an "electric" constant speed/variable speed drive/generator assembly (10), which finds use in aircraft, and in particular, in "all-electric" aircraft. The assembly (10) includes a planetary differential (20) whose output is controlled by a "make-up" induction motor (12). The induction motor (12) includes a squirrel-cage rotor (14) which is rotatable about a rotor-shaped stator (16). The assembly also includes a primary power generator (30) which includes a permanent magnet rotor (18) and an output winding (22). The rotor (18) is co-axial with and rotatable about, the outside of the rotor (14). The outer rotor (18) is driven by the planetary differential (20) in such a manner that the planet-carrier (24) is driven by the aircraft's engine, the ring-gear (26) drives the generator (30), and the sun-gear (32) is connected to the induction motor (12). Constant speed operation of the device is effective when the band-brake (34) is "off" and the induction motor (12) rotates at a speed, and in a direction, to compensate for the in-flight variations of the engine input-speeds to the planetary differential (20). When the band-brake (34) is "on," the sun-gear (32) is locked and the differential acts as a fixed ratio transmission. The result is a dual-speed range all-electric drive which enables the generator (30) to provide constant voltage/constant frequency or variable voltage/variable frequency power (proportional to engine speed).

10 Claims, 5 Drawing Figures

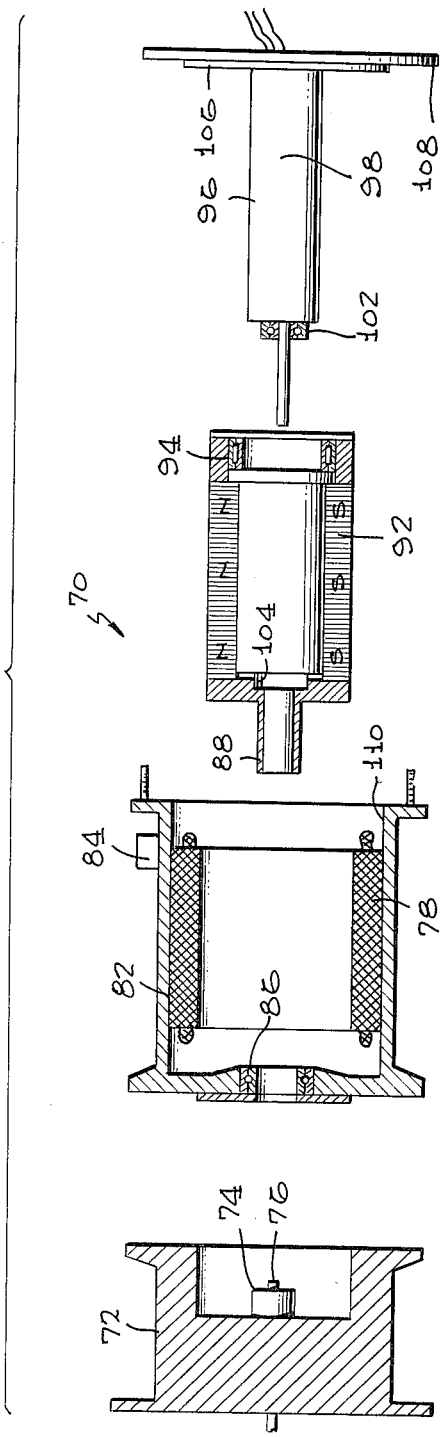

ELECTRIC CONSTANT SPEED/VARIABLE SPEED DRIVE/GENERATOR ASSEMBLY

TECHNICAL FIELD

The invention relates generally to aircraft primary power generation systems, and in particular to an electric constant speed/variable speed drive interfaced with a synchronous generator to provide constant-voltage/constant-frequency power over the take-off/cruise speed-range of an aircraft engine and variable-voltage/variable-frequency power below this speed range.

BACKGROUND ART

The aerospace industry has been dependent for many years on constant-speed-drives (CSDs), to provide constant-speed input to aircraft generators when the engine speeds vary over a 2:1, or more, speed range. While these drives have been satisfactory, their development has been protracted, in view of the difficulty of compacting sophisticated hydraulic and highly stressed mechanical components into small volumes. Thus these CSDs are generally costly, sophisticated, and more particularly, unsuitable for the large electric generators anticipated to be used in future "all-electric" airplanes.

A variety of differential and variable-ratio transmissions and drives utilized in conjunction with electric machines, are known in the prior art. Such drives are typified by those disclosed in U.S. Pat. Nos. 2,810,844 to Morrill; 3,032,696 to Payne et al; 2,077,768 to Perry; 2,990,503 to Clark; and 2,153,252 to Hansdorf.

In the '844 patent, a constant speed drive type system is disclosed which uses a differential planetary gear arrangement to control the frequency of a dynamo/electric machine, which derives a selected frequency, different from the base frequency of the machine. The '696 patent discloses an engine driven generator/motor that includes a variable-ratio drive interposed between the engine and generator. The drive system includes bi-directional (overrun) clutches to prevent direct drive of the transmission in the generator mode, and gear-reduction in the motor (start) mode. In addition, a current sensing control (current-transformer) is used to monitor and control the power taken by the motor/generator.

A synchronous drive system is disclosed in the '768 patent, wherein a frequency changer is driven at a variable speed, and rotary induction machines are electrically "locked in step" with the frequency generator. In this particular system, the machines operate at the speed of the frequency generator. The '503 patent, by contrast, describes a two directional power flow system that utilizes multiple devices such as a vari-drive, directional clutches, synchronous motor/generator, etc. In this system, the synchronous machine is automatically controlled when in a driving mode of operation, such that the ratio change in the drive gears is adjusted in dependence upon the torque and power of the driving motor, as ascertained by the magnitude of the current drawn by the machine. The system operates to maintain the magnitude of the current at a predetermined level.

Finally, a vari-drive (toroidal-type) transmission is shown in the '252 patent, driving an alternating current machine. The transmission allows for the supplying of power at various selective amounts from a constant speed motor, and provides a means for varying the proportionate actual speeds of rotating field and armature members of an electric machine.

All of the aforementioned prior art patents are directed to power systems quite different from the all electric constant speed/variable speed drive-generator assembly, as described by the present invention.

One power generation system which provides dual-range power over varying engine speed ranges is disclosed in co-pending U.S. patent application Ser. No. 235,354, for "Dual-Range Differential-Drive For AC And Induction Generators," filed Feb. 15, 1981 and assigned to the assignee herein. The application discloses a drive system which utilizes "straight" toroidal or "differential" toroidal drives to provide input speeds to synchronous or induction primary power generators, such that constant power is provided over a preselected speed range of the engines, and power proportional to speed is provided at speeds below the preselected speed range. Such systems do not, however, meet the objective, in an "all-electric" airplane, of being essentially "electrical" in their mode of operation.

The disclosures of all U.S. patents and co-pending patent applications referenced herein are hereby incorporated by reference.

It is a primary object then, of the present invention, to provide a compact, electric drive/generator assembly which operates in a constant-power and variable-power mode.

It is another object of the present invention to provide a power generation assembly, particularly for aircraft, that enables an optimal sizing of the drive and generator, even though they operate over a wide speed range, as is incident-upon operating the airplane through its flight envelope.

It is yet another object of the present invention to provide an electric constant-speed/variable-speed drive/generator which is particularly well adapted to modular construction techniques.

It is another object of the present invention to provide a compact electric/electronic alternative to conventional CSDs for operation in the somewhat hostile environment of aircraft power plants, where hydraulic fluids create prospective fire hazards.

These and other objects of the present invention will become more readily apparent after a full consideration of the following description of the instant invention, and the several advantages thereof enumerated herein.

SUMMARY OF THE INVENTION

The electric constant/variable-speed drive/generator of the present invention takes advantage of the modern technology of permanent-magnet materials, (such as samarium-cobalt) and the highly-rugged/highly-reliable squirrel-cage induction motor. The drive provides constant-voltage/constant-frequency power over typical aircraft engine cruise speed-ranges, for example 80% to 100%, and variable-voltage/variable-frequency below the 80% speed range, as for example from 80% down to 50% (ground idle speed).

The drive-generator assembly includes a housing, in which are interactively located: a planetary differential gearbox, including a "sun" gear; a "make-up" induction motor, comprising a three phase stator and a squirrel-cage rotor; a primary ac generator, comprising a permanent magnet rotor and a three phase output winding; and an electromagnetic brake element. When "on," the make-up" or induction motor locks the "sun" gear, causing the generator to operate in a variable speed and variable voltage/variable frequency mode. When the brake is "off" the induction motor, under the control of speed logic, drives the "sun" gear at a speed and in a direction to maintain a scheduled speed condition for the generator.

The novel features which are believed to be characteristic of the invention, both as to its organization and it method of operation, together with further objects and advantages thereof, will be better understood from the following description, taken in connection with the accompanying drawings in which a presently preferred embodiment of the invention is illustrated by way of example. It is to be expressly understood, however, that the drawings are for purposes of illustration and description only, and are not intended as a definition of the limits of the invention.

DESCRIPTION OF DRAWINGS

FIG. 5 is an exploded schematic of a modular production configuration of the electric drive of the present invention. Like parts are denoted by like numerals in the various drawing figures.

DESCRIPTION OF THE INVENTION

Figure 1:
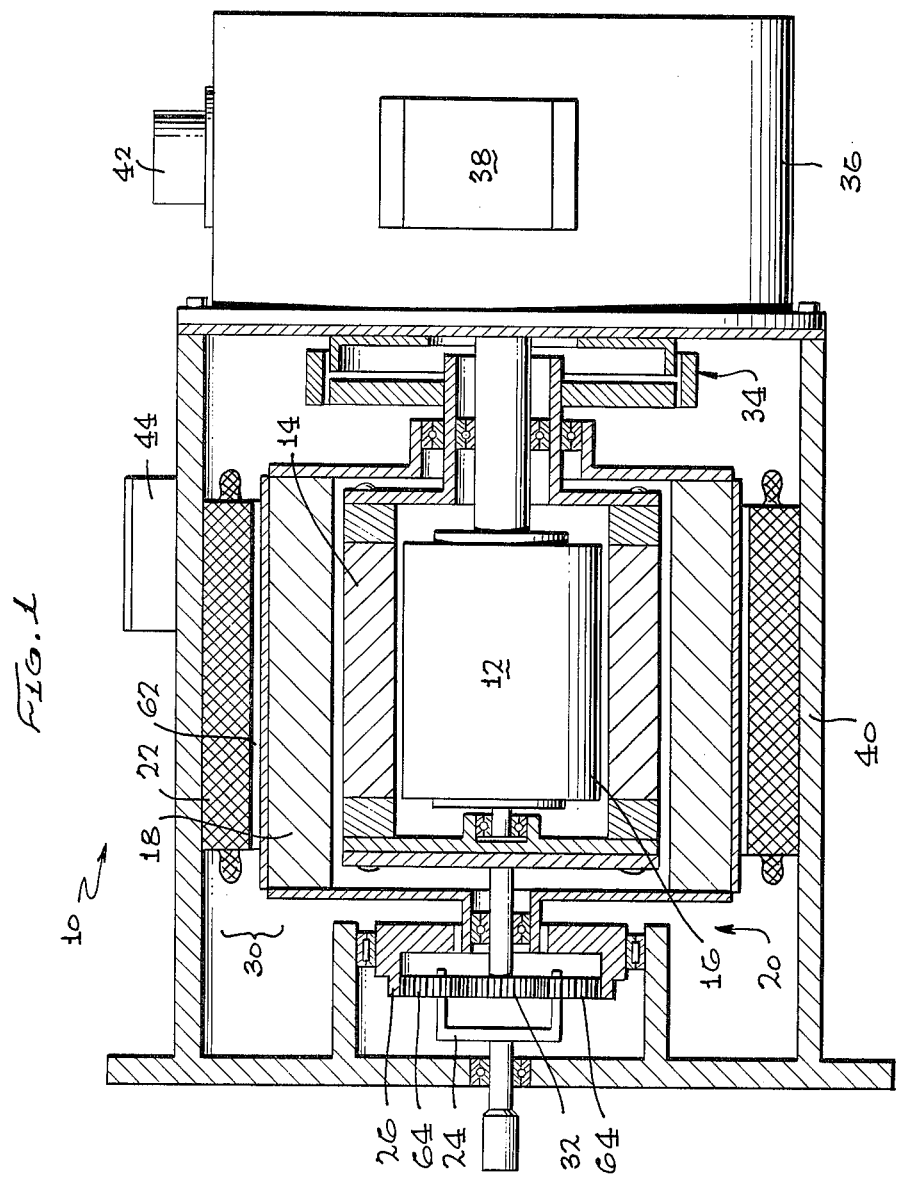
FIG. 1 is a schematic illustration of one physical embodiment of an electric constant speed/variable speed drive/generator assembly in accordance with the present invention.

Referring now to the drawings, FIG. 1 is schematically illustrative of the electric constant/variable speed drive/generator assembly (10) of the present invention. In accordance with the FIG. 1 embodiment, the output speed of the planetary differential (20) is controlled by an "inverted" squirrel-cage induction-motor (12), whose squirrel-cage rotor (14) rotates around the outside of a rotor-shaped stator (16), rather than inside, as in a conventional induction-motor. On the outside of the induction-motor (12), and co-axial with it, is a second (outer) rotor (18), which carries an array of permanent magnets, to form a multi-pole field system, rotating inside the outside ac stator. The number of poles, and the driven-speed of the permanent-magnet outer rotor (18), determines the output-voltage and frequency of the power generated in the output winding (22). The second outer rotor (18) is driven, via the planetary differential (20), in such a manner that the planet-carrier (24) is driven by the engine (not shown), the ring-gear (26) drives the generator (30), and the sun-gear (32) is connected to the bi-directional/variable speed induction motor (12). The purpose of the induction motor (12) is to rotate at a speed, and in a direction, so as to compensate for the in-flight variations of the engine input-speeds to the differential.

Figure 2:
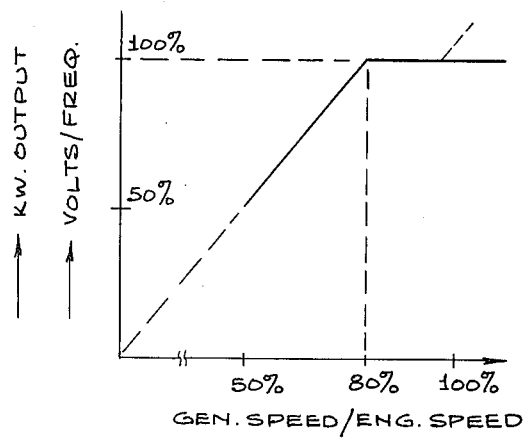
FIG. 2 is a graph showing the typical speed range characteristics of the assembly of FIG. 1.

The drive/generator assembly (10) includes an electromagnetic brake-clutch, shown in FIG. 1 as a band-brake (34). The purpose of the clutch is to "lock" the sun-gear (32) when the engine input-speed drops below some predetermined threshold, in this embodiment, the 80% speed threshold. When this happens, any further reduction in input speed results in the permanent magnet outer rotor (18) speed decreasing proportionally with input speed. The output voltage/frequency of the power from the output winding (22) also drops proportionally with speed. Reference is made to FIG. 2, wherein the speed vs voltage/frequency and power characteristics of the drive/generator assembly (10) is shown.

A power electronics unit (36), providing variable voltage/variable frequency power, an induction motor power element (38), and an input control (42) for the power electronics, are shown secured to the housing (40) at the anti-drive end of the drive/generator assembly (10). A three phase input ac supply (44) is also shown secured at the housing (40).

Figure 3:
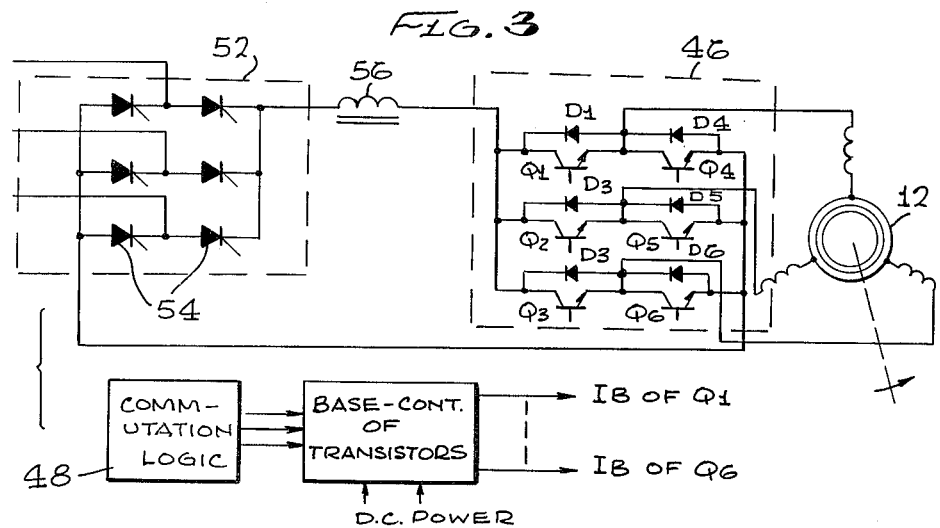
FIG. 3 is a schematic representation showing the power electronics that control the "make-up-motor," depicted in FIG. 1.

Synthesized ac power for the induction motor (12) is derived by electric-commutation unit (46), FIG. 3, via the power transistors $Q_1$–$Q_6$. The frequency of the applied synthesized ac wave is controlled by the commutation-logic (48), which may comprise IC chips or modules specially designed for such function and control. These modules are typically available in the marketplace for such functions as variable-speed control of ac motors.

A phase-delay rectifier, PDR, (52) consisting of six silicon controlled rectifiers (SCR's) (54) is used to control and adjust the amplitude of the voltage of the synthesized ac wave applied to the induction motor (12), as a function of the commutation frequency. Thus, the voltage and frequency of the power applied to the induction motor (12) is determined by the electronic commutator (46) and the PDR (52). Because the power-transistors are operated in a "switching-mode," their power (heat) dissipation is low and, consequently, the efficiency of the inverter/electronic commutator (46), is high. Since, however, current is being switched rapidly between the power transistors $Q_1$–$Q_6$ during the operational-mode, a filter (56) is used to smooth the input to the electronic commutator (46), to minimize RFI (radio frequency interference).

Reference is made also to the diodes $D_1$–$D_6$ in the FIG. 3 schematic. These diodes are connected with "inverse-polarity" across each power transistor $Q_1$–$Q_6$ respectively, and their purpose is to allow for a reactive current flow.

To summarize, the function of the control system embodiment of FIG. 3 is to create a bi-directional synthesized rotating field in the induction motor (12) in response to the dictates of the speed logic. It will be recognized by those versed in the technology that the equivalent circuit of an induction motor can be represented primarily by a reactance, $X_L$, whose impedance is proportional to frequency. Therefore, as the frequency of the supply to the motor is increased, then the voltage of the supply must be increased also. This results in the inverter furnishing power, wherein the voltage/frequency (E/F) ratio is maintained relatively constant. This provides a somewhat ideal power characteristic for the variable speed induction motor.

It is of note in discussing electronic power supplies for motor speed control to recognize that the electronic commutator can also be a "cycloconverter," which is an ac to ac static conversion device. However, such converters can operate efficiently only when the input to output frequency is typically in excess of 2:1. Therefore, the frequency of the power supply limits the output frequency of the converter and consequently, the speed of the induction motor, for a given number of electromagnetic poles. It is nonetheless possible to consider such converter technology, when higher frequencies are available, as they are in aircraft where the power frequencies are 400 Hz, 800 Hz or higher.

Since aircraft generators typically use blast air or pressurized-oil for the dual-purpose of lubricating and cooling, it is an intent of the instant invention that the drive/generator assembly (10) take advantage of such integrated cooling provisions.

In operation, when the electric band-brake (34) is "on," the sun-gear (32), is locked for all conditions except in a preselected engine speed range as, for example, between 80% and 92% cruise-speed of the aircraft engine(s), when the induction motor (12) performs the speed-control function. During this operational mode the sun-gear (32) dynamically reacts the torque of the planetary-differential (20). Where the speed logic modulates the sun-gear speed around a mid-point, a "straight-through" condition can exist and cause a possible frequency-modulation problem, which is manifest by cyclical-variations in output speed (frequency). However, when the speed control is mid-point and it is necessary to supply 20% "differential-power" then the induction make-up motor need only provide ±10% of the output power.

Figure 4:
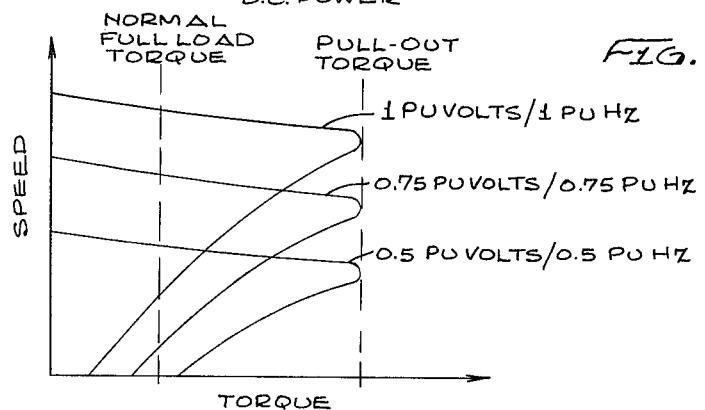
FIG. 4 shows the torque characteristics of the induction generator machine depicted in FIG. 1.

By way of further refinement, the drive/generator assembly of the present invention can energize the clutch-brake "on" during heavy overloads, or short-circuit faults on the output of the generator. Typically, when an induction-motor is running, and reacting torque, its "slip" will increase in the presence of an overload, although the motor can have a high "pull-out" torque capability as illustrated in FIG. 4. Consequently, it is necessary when considering the dynamics of the operation of the drive-generator assembly (10) to ensure that these overload torque conditions are not exceeded, otherwise the machine output would be "soft" and it would tend to "sit down" on faults. An alternative, as mentioned above, would be to sense these high overcurrents, by means of a current-transformer (not shown), and energize the band-brake (34), to lock the sun-gear, when a preselected current-level is exceeded.

Another unique feature resident in the design of the FIG. 1 embodiment of the present invention is that the samarium-cobalt outer rotor (18) has the capability to establish a high-density magnetic flux in the air gap (62). However, unlike a wound rotor field, the permanent magnet field cannot be de-energized, so any fault in the output winding or the generator feeders) can result in very heavy fault-currents, with no way to interrupt them, other than to isolate the generator mechanically from the engine-drive. In the present invention, however, torque cannot be transmitted through the planetary differential (20) unless it is reacted by the sun-gear (32). Therefore, if electric power to the inside rotor-shaped stator (16) is disconnected, the sun-gear (32) will run free and it will not react any torque developed by the planet gears (64). In this manner power transmission through the gearbox is effectively interrupted.

FIG. 5 illustrates a modular "production" configuration (70) of the electric drive/generator assembly of the present invention, which facilitates easy assembly and disassembly. This modular electric constant/variable-speed drive/generator (70) consists of four main elements:

(1) A planetary differential gearbox (72) for mounting on the aircraft engine, not shown), having concentric output shafts (74) and (76);

(2) A polyphase (3 phase 800 Hz 400 V AC) stator (78), integral with housing (82), a terminal block (84); and bearing (86) to accommodate the shaft (88) of the permanent magnet rotor (92);

(3) The permanent magnet (samarium-cobalt) rotor (92) carrying a needle (roller) bearing (94), to fit over the outside diameter (96) of the induction-motor/gearbox/brake cartridge (98); and (4) The induction-motor/gearbox/brake cartridge (98), which carries a ball bearing (102) that fits inside a cavity (104) in the rotor (92), including a pilot ring (106) and a motor flange (108). A motor-gearbox (not shown) to permit the induction motor to run at a high speed and so reduce its weight and size. A further advantage of the gearbox is that it minimizes the inertia of the generator rotor, referred to as the induction motor.

The pilot ring (106) locates within the internal diameter (110) of the stator housing (82), to insure co-axial alignment. Mating of co-axial shafts is carried out via splined couplings (not shown): mating of gearbox (72) with the synchronous generator (82) is made with a quick attach/detach clamp, typically in use in aircraft.

The principle of operation of the modular unit (70) is the same as described hereinabove with respect to FIG. 1: the engine (not shown) drives a planet-carrier with its three planet gears; the induction-motor cartridge (98) drives the sun-gear, within the planetary differential gearbox (72); and the ring-gear, within the gearbox (72), drives the generator. This, however, is an optional arrangement. During conditions when the engine speed drops below 92%, the motor-brake is released, and the speed control logic (not shown) adjusts the speed and direction of the sun-gear (32) to maintain a constant output speed to the electric generator (30) via the ring-gear (26) down to say 80% input speed. When on final-approach, the engine speed falls below 80%, the motor-brake (34) is again re-energized, "to lock" the sun-gear and place the drive in a "variable-speed" mode. Therefore, between 80% and 50% speeds, the input and output speeds are directly-related by the gear-ratio, effective within the differential gearbox.

The electric constant speed/variable-speed drive-generator assembly of the present invention offers several advantages, the primary ones being as follows:

(1) The design is an electric/electronic-alternative to conventional constant speed drives.
(2) The machine is compact, potentially lightweight and modular in design.
(3) The operational mode is flexible and adaptable to control by means of a micro-processor.
(4) The electric band-brake (34), or motor brake in the cartridge (98), can be used to allow the differential (make-up) induction motor (12) to operate (or not operate) during normal cruise-flight; (i.e., at 92% engine speed, approximately).
(5) The electrical-capacity of the generator (30) is 100% down to a base-speed of only 80%: below this, the generator (30) provides power-proportional-to-speed.
(6) The design reduces the "rating" of the "make-up" electronics and the induction motor, since they only operate down to an 80% base speed.
(7) The reliability and maintenance-support of the machine is anticipated to be much lower than with conventional CSD machinery.

(8) Acquisition costs are anticipated to be less for the large capacity drive/generator assemblies, projected for future "all-electric" aircraft.

(9) The design takes advantage of the latest permanent magnet technology and combines it with highly-reliable/rugged squirrel-cage induction-motor technology.

(10) The design is completely brushless.

(11) The permanent magnet generator (30) operates inherently as a variable-voltage/variable-frequency machine, which is ideal for induction motors, transformers, etc. (This advantage is qualified by the fact that motor-speeds will decrease with frequency, and transformer-voltages etc. will also decrease with frequency).

(12) The generator (30) is rated as a constant speed machine, but the make-up induction motor (12) provides only ±10% power between 80% and 100% speed.

(13) With the engine stopped (and the planet-carrier (24) stationary), the PM rotor (18) can be driven by the induction-motor (12) to provide a small amount of power (up to the capacity of the induction motor) in the output ac winding. The voltage level and frequency of the output power will in this case be determined by the speed at which the sun-gear is driven by the induction-motor (12).

It is apparent that there has been provided with this invention a novel constant speed/variable speed drive/generator assembly which fully satisfies the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

INDUSTRIAL APPLICATION

The electric constant speed/variable-speed drive/generator assembly of the present invention is useful in aircraft environments to provide constant voltage power over predetermined aircraft engine speed ranges and variable voltage/variable frequency power at speeds outside the predetermined range.

I claim:

1. An electric constant-speed/variable-speed drive/generator unit for receiving mechanical input power from an engine and for generating electrical power comprising:
   an ac synchronous generator having rotor and stator elements;
   a bi-directional and variable-speed ac induction motor having rotor and stator elements;
   a drive assembly coupling said engine, said generator and said motor together such that said engine drives said generator and said motor can affect the rate that said engine drives said generator;
   means for controlling the speed and direction of said induction motor and for selectively operating said induction motor with said drive assembly, whereby said generator provides constant-voltage/constant-frequency power over a preselected speed range of said engine, and variable-voltage/variable-frequency power over speeds outside said preselected range comprising:
   speed logic means;
   a brake element adapted to selectively operate said induction motor with said gear drive assembly;
   power electronic means for providing a bi-directional synthesized rotating ac power field in said induction motor; and
   said brake element, speed logic means, and power electronic means being interactively arranged such that said brake element is "on" at engine speeds outside said preselected range and said induction motor locks said drive assembly means causing said generator to operate in a variable-voltage/variable-frequency mode, and said brake element is "off" at engine speeds within said preselected range and said induction motor operates to drive said drive assembly means at a speed and in a direction to maintain said generator in a scheduled constant-voltage/constant-frequency mode.

2. An electric drive/generator unit as in claim 1 including a housing, said generator, induction motor and drive assembly being enclosed in said housing.

3. An electric drive/generator unit as in claim 1 wherein said generator stator is a fixed position stator and said generator rotor is a permanent magnet rotor arranged to rotate outside and co-axial with said induction motor rotor.

4. An electric drive/generator unit as in claim 3 wherein said induction motor stator is fixed and said induction motor rotor is a squirrel-cage rotor arranged to rotate about said induction motor stator.

5. An electric drive/generator unit as in any one of claims 1, 2 or 3 wherein said gear means comprises a planetary differential gearbox.

6. An electric drive/generator unit as in claim 5 wherein said induction motor includes an output shaft, said differential gearbox including interacting gear means comprising: first gear means connected to said output shaft, second gear means arranged for driving said generator rotor, and third gear means driven by said engine.

7. An electric drive/generator unit as in claim 6 wherein said first gear means comprises a sun gear, said second gear means comprises a ring-gear, and said third gear means comprises a planet-carrier.

8. An electric drive/generator unit as in claim 7 wherein said unit is a modular drive/generator unit having a plurality of interfitting and co-acting modular elements.

9. An electric modular drive/generator unit as in claim 8 wherein said plurality of modular elements includes a first modular element comprising said induction motor and brake element, a second modular element comprising said generator rotor, a third modular element comprising said generator stator, and a fourth modular element comprising said gear means.

10. An electric drive/generator unit as in claim 1 wherein said induction motor and gear means are adapted to drive said rotor when said engine is stopped.

* * * * *